United States Patent [19]
Guseinov et al.

[11] 3,948,609
[45] Apr. 6, 1976

[54] REACTION APPARATUS

[76] Inventors: Nazim Museib Ogly Guseinov, ulitsa Gusi Gadzhieva, 3 blok, 1, kv. 12; Vageb Safarovich Aliev, ulitsa Nizami, 66 blok, 5, kv. 40, both of Baku, U.S.S.R.

[22] Filed: Jan. 2, 1974

[21] Appl. No.: 429,829

[52] U.S. Cl................ 23/288 K; 23/283; 23/288 E; 23/288 G; 23/288 S
[51] Int. Cl.² ....... B01J 8/08; B01J 8/12; B01J 8/18
[58] Field of Search .......... 23/288 K, 288 E, 288 G, 23/288 S, 283

[56] References Cited
UNITED STATES PATENTS

| | | | |
|---|---|---|---|
| 2,433,726 | 12/1947 | Angell | 23/288 X |
| 2,507,105 | 5/1950 | Howard et al. | 23/288 E X |
| 2,533,666 | 12/1950 | Gunness | 23/288 S X |
| 2,943,922 | 7/1960 | Daniels | 23/288 S |
| 3,737,288 | 6/1973 | Hochman | 23/288 E X |

*Primary Examiner*—Morris O. Wolk
*Assistant Examiner*—Barry I. Hollander
*Attorney, Agent, or Firm*—Holman & Stern

[57] ABSTRACT

In the reaction contrivance disclosed which serves the purpose of oxidizing hydrocarbons over a catalyst, with the catalyst being disposed in a casing of the contrivance. Next to an inlet into a reactor disposed in the casing, is a mixing chamber fitted rigidly, and linked with the casing of the contrivance. A separator is arranged at the outlet of the reactor. The mixing chamber provides a means of forming a reaction mixture of the reactants and the catalyst drawn from the casing and into the reactor. By virtue of this arrangement the entire surface of catalyst is in contact with the reactants and the yield of final product increases.

5 Claims, 8 Drawing Figures

REACTION APPARATUS

The present invention relates to apparatus used in the chemical industry, and more specifically to reaction contrivances.

The invention can be used to advantage in the industry of organic and inorganic chemical synthesis involving reactions oxidizing hydrocarbons such as oxidative ammonolysis for example.

The most promising use of the invention can be in exothermic reactions of oxidation when no reactivation of the catalyst is required as in the case, of for instance, the production of ethylene oxide, propylene oxide, acrolein, maleic and phthalic anhydrides.

A reaction contrivance is known for carrying out exothermic heterogenous reactions of oxidizing hydrocarbons over a catalyst of a given granularity consisting of a hollow casing being disposed therein at least one reactor and an arrangement for circulating a coolant inside the casing to remove the heat of reaction from the reactor. The known reaction contrivance comprises a cylindrical casing having covers fitted with a pipe for either introducing the reactants or removing the products of reaction. Disposed in the casing parallel to its axis there are over 10,000 tubes each serving as a reactor. The free ends of tubes are secured to tube plates and these are clamped between the casing of the contrivance and a cover. The casing is provided with pipes for admitting and discharging the coolant.

The known reaction contrivance operates along the following lines;

Before proceeding with a reaction, the reactor tubes are filled with a catalyst in pellets of an optimum size which is determined by the capacity of the contrivance. Next, the premixed and preheated reactants are pressure-fed through the pipe in one of the casing covers and enters the catalyst-filled reactor tubes where the reaction of oxidation takes place at the surface of the catalyst. Yet, a point to be noted is that the pellets of catalyst contact each other in such a way so that the reaction takes place only over the surface and free from contact or, in other words, the catalyst is utilized only partly. This is one of the drawbacks of the known reaction contrivance.

Accompanying the reactions in which heat is evolved in considerable amounts, as is the case while oxidizing ethylene, are side reactions of the complete combustion of some of the product being oxidized. These side reactions produce a thermal effect which is by far greater than the effect of the main reaction. Returning back to the complete reaction of ethylene oxidation, it is evident that the amount of heat evolved during the combustion of ethylene is 10 times the thermal effect of the main reaction:

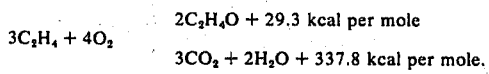

$$3C_2H_4 + 4O_2 \begin{array}{l} 2C_2H_4O + 29.3 \text{ kcal per mole} \\ 3CO_2 + 2H_2O + 337.8 \text{ kcal per mole.} \end{array}$$

An increase in the temperature in the reaction zone of such reactors causes, in its turn, an increase in the rate of side reactions. In order to remove the excess of heat, a coolant is circulated in the casing between the tubes. For monitoring the process, the temperature at which the process of oxidation goes on in each of the reactor tubes is read at a control desk by some means. The products of reaction are removed from the casing through the pipe in one of the covers and the final product is then separated from the unreacted components.

The known reaction contrivance is, as a rule, a bulky one due to the presence of a great number of reactor tubes, which is another disadvantage.

A further disadvantage of the known reaction contrivance is its limited capacity which depends on the extent of the surface of catalyst which is in contact with the reactants. In the known reaction contrivances, the only means of controlling the capacity is by changing the number of reactor tubes. If the number is increased, this, in its turn, calls for an increase in the diameter of casing, in the thickness of wall, and in the tube plates.

Still another disadvantage of the known reaction contrivance is the difficulty experienced in maintaining a stable temperature considering the height of each reactor tube and in the contrivance as a whole. The explanation is that when the tubes are being filled with a catalyst its bed may vary in depth from tube to tube depending on the relative position of pellets one with respect to another, i.e., depending on the packing density of the tubes with the catalyst. As a result, the area of the free surface of the catalyst over which the reaction takes place differs from tube to tube and the reactants are distributed in a non-uniform way between the tubes. This brings about a temperature instability along the height of each tube and leads to an increase in the temperature of some tubes above the tolerable limit, and to a prohibitively high side reactions rate accompanied by the liberation of heat in considerable amounts — a factor which may cause local overheating in the tubes, then sintering of the catalyst therein which and may result in tube failure.

It is an object of the present invention to provide a reaction contrivance for carrying out exothermic heterogenous reactions such as oxidizing hydrocarbons over a catalyst which would possess a relatively high capacity.

Another object of the present invention is to provide a reaction contrivance having a design which is simple and proves reliability in operation.

Said and other objects are achieved in a reaction contrivance for carrying out exothermic heterogenous reactions in the oxidation of hydrocarbons over a catalyst of a given granularity consisting of a hollow casing with pipes for feeding the reactants and discharging the products of the reaction, which contrivance contains at least one reactor, and a means of circulating a coolant inside the casing so as to remove the heat of reaction from the reactor. In accordance with the invention, disposed in the contrivance between the casing and the pipe serving to feed the reactants there is a mixing chamber rigidly linked with the casing whereas the catalyst is contained in the casing wherefrom it is drawn into the mixing chamber to form a reaction mixture with the reactants as these are being fed into the reactor and fitted at an outlet from the reactor between the casing and the pipe for discharging the products of reaction where there is a separator serving to separate the products of reaction from the catalyst which returns back into the casing of the contrivance due to gravity upon leaving the separator.

Since the catalyst is disposed in the stream of reactants, the reaction takes place over the entire surface of the catalyst.

It is expedient that the mixing chamber is receptacle embracing a portion of the reactor with its inlet in proximity to which there is disposed in the receptacle a rigidly secured shell serving to direct the reaction mixture into the reactor; an opening in said shell registers with the inlet into the reactor and the shell narrows towards the opening, the angle formed by the shell with the internal surface of the receptacle as well as the area of the opening being selected depending on the capacity of the contrivance and the size of catalyst pellets. A mixing chamber arranged on these lines allows for feeding into the reactor a reaction mixture whose composition which assures the maximum possible yield of final product.

It is also expedient that the separator be a receptacle whose diameter far exceeds the diameter of reactor and which is fitted with a pipe for charging the casing of the contrivance with the catalyst before starting the process and that a shell disposed in the receptacle serves to change the direction of a stream of the products of reaction leaving the reactor mixed with the catalyst; said shell embracing a portion of the reactor with its outlet so that a clearance is formed between the internal surface of shell and reactor which enables the products of reaction and catalyst to pass with, the distance between the outlet from reactor and the surface of shell opposite the outlet and the inside diameter of the separator receptacle being selected depending on the velocity of the mixture from the products of reaction and catalyst leaving the reactor. The relationship between the diameters of the separator receptacle and reactor suggested allows a reduction of the velocity of the stream of the products of reaction and the catalyst so as to enable the separation of the catalyst.

In an embodiment of the invention the reactor is disposed in the casing of the contrivance with a provision for a vertical adjustment of the distance between the reactor inlet and the shell of the mixing chamber by means of shims interposed between the bearing surfaces of brackets provided at the top portion of the reactor and the shoulders secured to the internal surface of the casing, with the former resting freely on the latter.

In another embodiment of the invention, the casing is provided with at least one additional pipe located above the bed of the catalyst and serving to feed the unreacted components being separated from the products of reaction for further oxidation of said components in the casing space above the pipes by means of the catalyst leaving the separator. This arrangement adds to the capacity of the reaction contrivance.

The present invention will be best understood from the following detailed description of a preferred embodiment of the invention when read in conjunction with the accompanying drawings in which.

Figure 1:
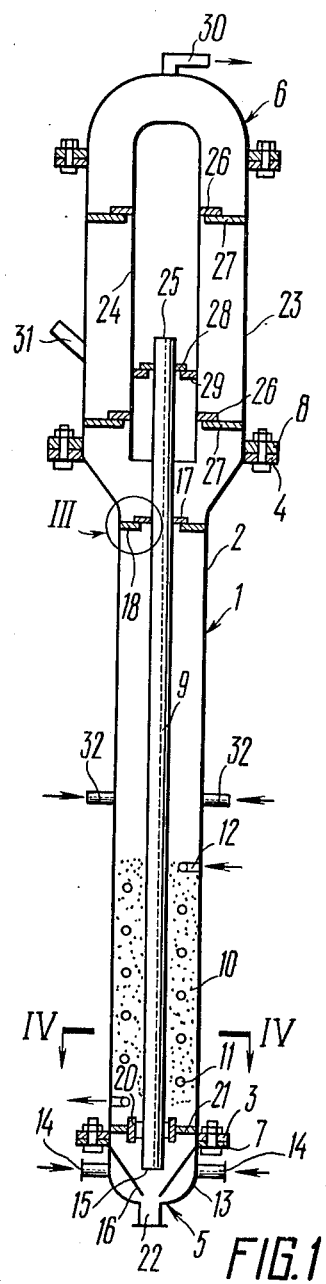
FIG. 1 is a schematic sectional elevation of the reaction contrivance according to the invention.

The reaction contrivance serves the purpose of oxidizing hydrocarbons over a catalyst. The description deals with a contrivance featuring one reactor for oxidizing ethylene (Chd $2H_4$) but the contrivance is equally suitable for the oxidation of other hydrocarbons.

The contrivance consists of a casing 1 (FIG. 1) which is a vertically placed cylinder 2 with flanges 3 and 4 fitted to which are mixing chamber 5 and a separator 6, respectively, and flanges 7 and 8, respectively.

Disposed in the casing 1 is a reactor 9 which is a tube the diameter of which is selected depending on the capacity of the contrivance and is installed coaxially with the casing 1.

Contained in the lower portion of the casing 1 in an annular space between the reactor 9 and the internal surface of the cylinder 2 there is a catalyst 10. For oxidizing ethylene, the catalyst 10 consists of silver-coated pellets of fused alumina. The size of pellets is in conformance with the capacity of the contrivance and its dimensions.

Disposed in the bed of the catalyst 10 is a cooling coil 11 circulating therethrough which is a coolant which removes excess heat liberated during the reaction. The coolant is fed into, and discharged from, the casing 1 through pipes 12.

Figure 2:
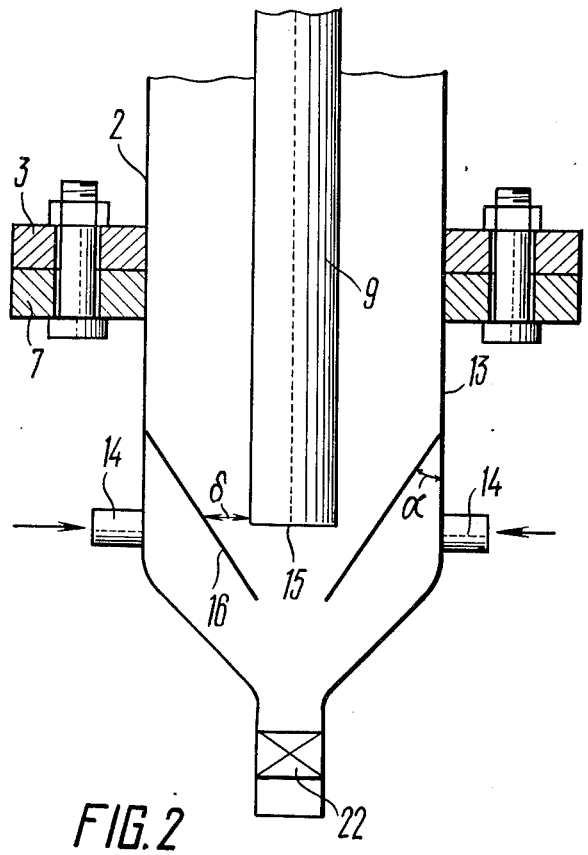
FIG. 2 is a sectional elevation of the mixing chamber according to the invention.

The mixing chamber 5 is a receptacle 13 (FIG. 2) of a diameter which is, as a rule, equal to the diameter of the casing 1, being its continuation. The receptacle 13 has two pipes 14 introduced through which are the reactants, i.e., ethylene ($C_2H_4$) and oxygen ($O_2$). The receptacle 13 embraces a portion of the reactor 9 with an inlet 15. Next to the inlet there is a shell 16 rigidly secured in the receptacle 13 for the purpose of directing a mixture of the reactants and the catalyst 10 which is drawn by the stream of reactants from the casing 1 into the reactor 9. Thus, the catalyst 10 and the reactants make up the reaction mixture.

In order to prevent a blow-by of the reactants into the space in the casing 1 above the bed of the catalyst 10, this bed should be of a sufficient depth which in the case under consideration is between 0.2 and 0.4 of the height of the reactor 9. Said depth provides for the requisite resistance and a pressure which enables the catalyst 10 to be drawn into the mixing chamber 5.

The shell 16 is a truncated cone tapering towards the inlet 15 into the reactor 9 so that the opening in the shell 16 is opposite the inlet 15 into the reactor 9.

The shape of shell may vary with the type and shape of the catalyst and the conditions of the process and can be of paraboloidal, spherical or any other configuration determined by calculations.

The shell 16 is disposed with respect to the internal surface of the receptacle 13 at an angle, $\alpha$, which is selected, along with the area of the opening in the shell 16, depending on the capacity of the reaction contrivance. In the case under consideration, the diameter of the opening in the shell 16 is between 0.6 and 0.75 of the diameter of the reactor 9.

Figure 3:
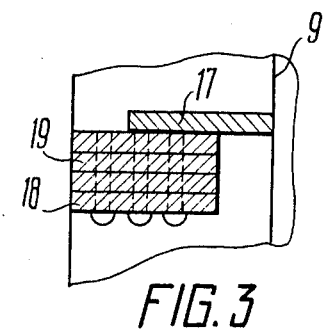
FIG. 3 is a view of portion III of FIG. 1 on an enlarged scale.
Figure 4:
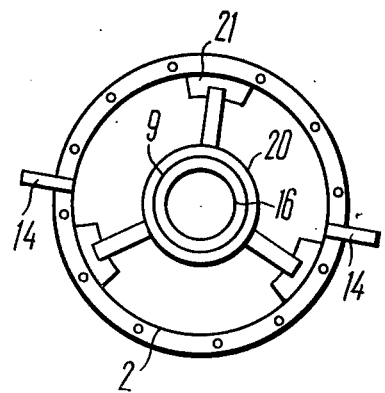
FIG. 4 is a section on line IV—IV of FIG. 1 on an enlarged scale.

An annular clearance is formed between the shell 16 and the reactor 9 entering the shell clearance whose width, $\delta$, is determined by the position of the reactor 9 with respect to the casing 1 and depends also on the capacity of the contrivance. The reactor 9 is provided with brackets 17 running all the way around the circumference at the same level within the upper portion of the reactor and resting unfastened on shoulders 18 arranged on the internal surface of the cylinder 2 of the casing 1. Said distance between the reactor 9 and the shell 16 is adjusted by means of shims 19 (FIG. 3) interposed between the bearing surfaces of the brackets 17 and shoulders 18 (FIG. 1). In the case under consideration, the width, δ, varies between 0.25 and 0.40 of the diameter of the reactor 9. In order to align the inlet into the reactor 9 with the opening in the shell 16, there is a ring 20 (FIG. 4) disposed in the casing 1 and linked up with it by radial links 21. The reactor 9 freely enters the ring 20.

At the bottom of the receptacle 13 (FIG. 2) of the mixing chamber 5 there is a pipe 22 serving to discharge the catalyst 10 from the casing 1.

Figure 6:
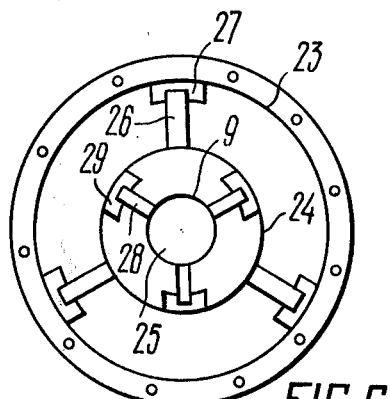
FIG. 6 is a section on line VI—VI of FIG. 5.
Figure 5:
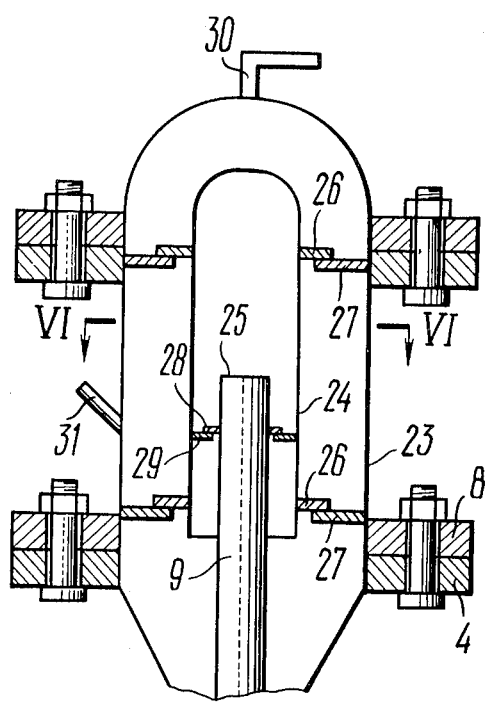
FIG. 5 is a sectional elevation of the separator according to the invention.

Topping the casing 1 is a separator 6 connected thereto. The separator is a cylindrical receptacle 23 (FIG. 5) of a diameter which is by far greater than the diameter of the reactor 9. Disposed coaxially with the receptacle 23 there is a shell 24 which embraces a portion of the reactor 9 with its outlet 25. Formed between the internal surface of the shell 24 and the reactor 9 (FIG. 6) is an annular clearance which provides a passage for the mixture of the products of reaction and the catalyst leaving the reactor 9. The shell 24 (FIG. 5) serves to change the direction of the stream of the products of reaction with the catalyst 10 leaving the reactor 9 and to protect the receptacle 23, its top portion in particular, from erosion brought about by the striking pellets of the catalyst 10 as these are leaving the reactor 9 at high velocity which is a factor governing the distance between the outlet 25 from the reactor 9 and the top of the shell 24 of the separator 6. In order to minimize the velocity of the products of a reaction passing through the annular clearance between the reactor 9 and the shell 24, the internal diameter of the receptacle 23 is from 6 to 8 times the diameter of the reactor 9. The shell 24 is fitted in the receptacle 23 of the separator 6 by means of brackets 26 spaced equidistantly all the way around its external surface at two different levels and resting unfastened on shoulders 27 provided on the internal surface of the receptacle 23 of the separator 6.

That portion of the reactor 9 which enters the shell 24 is provided with brackets 28 spaced on the outside equidistantly all the way around the circumference and resting unfastened on shoulders 29 fitted to the internal surface of the shell 23. The distance between the reactor 9 and the shell 16 of the mixing chamber 5 is adjusted by placing shims (not shown) between the bearing surfaces of the brackets 28 and shoulders 29. Said shims are placed simultaneously with the shims 19 (FIG. 3) which are interposed between said brackets 17 of the reactor 9 and said shoulders 18 of the casing 1.

The products of reaction along with the unreacted hydrocarbons, which are ethylene in the case under consideration, are removed through a pipe 30 topping the receptacle 23 of the separator 6. Another pipe 31 provided in the receptacle 23 is intended to serve the purpose of charging the casing 1 with the catalyst 10 preparatory to starting the process.

The contrivance disclosed herein offers the possibility of oxidizing the ethylene which has failed to react in the reactor 9, this reaction of oxidation taking place over the catalyst leaving the separator 6. Serving this purpose are pipes 32 provided in the cylinder 2 (FIG. 1) of the casing 1 above the bed of the catalyst 10.

Figure 8:
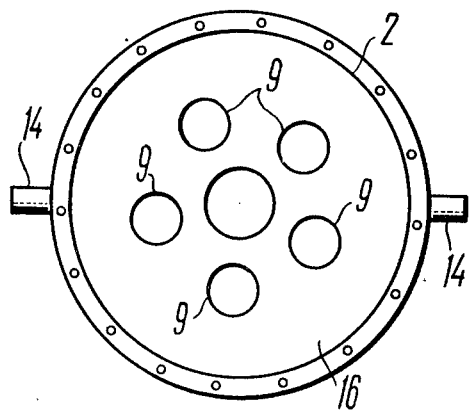
FIG. 8 is a section on line VIII—VIII of FIG. 7.
Figure 7:
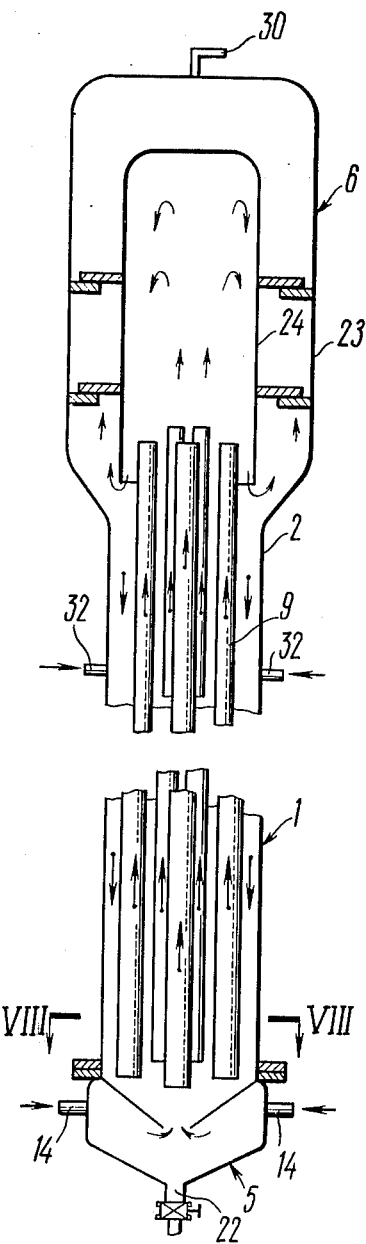
FIG. 7 is a sectional elevation of the reaction contrivance in another embodiment.

Referring to FIG. 7, this is a schematic diagram of another embodiment of the reaction contrivance featuring a plurality of reactors 9. Serving all these reactors 9 are a common mixing chamber 5 and a common separator 6. The way the reactors 9 are disposed in the casing 1 is illustrated in FIG. 8.

Before starting the process all pipes of the reaction contrivance are closed, and the reactor 9 is adjusted for correct position inside the casing 1 by means of the shims 19 placed between the bearing surfaces of the brackets 17 and shoulders 18 as well as between those of the brackets 28 and shoulders 29. These shims enable the distance δ between the inlet 15 into the reactor 9 and the shell 16 to be adjusted depending on the capacity of the contrivance and the size of catalyst pellets. The same applies to the distance between the outlet 25 from the reactor 9 and the shell 24 of the separator 6. The pipes 14 of the mixing chamber 5 are connected to the lines providing a supply of hot air and an ethylene-air mixture. The pipe 30 of the separator 6 is connected to the atmosphere for bleeding hot air and to a discharge line through which the products of reaction are removed for the purpose of separating the unreacted components from the final product. The pipes 32 are connected to a line serving to feed the unreacted components in a mixture with air after the separation.

The reaction contrivance operates on the following lines:

Before starting the process of oxidizing ethylene, the pipe 31 is opened and the casing 1 is charged with the catalyst 10 in an amount depending on the capacity of the reaction contrivance, thus filling some of the annular space between the reactor 9 and cylinder 2. The pipe 31 is then closed and a pipe 14 of the receptacle 13 of the mixing chamber 5 and the pipe 30 of the receptacle 23 of the separator 6 are made open. Hot air enters the reaction contrivance at a temperature of 300° C and heats both the catalyst 10 and the contrivance as a whole. A stream of air is directed from the receptacle 13 of the mixing chamber 5 to the inlet 15 into the reactor 9 by the shell 16. The velocity of the hot air supplied is sufficient to create a sucking action at the inlet into the reactor which causes the catalyst 10 to be drawn from the casing 1 into the reactor 9 by way of the annular clearance δ between the shell 16 and reactor 9. Upon entering the reactor 9, the mixture of hot air with the catalyst 10 passes through said reactor and is discharged into the shell 24 of the separator through the outlet 25. Thence the mixture of air and catalyst passes through the annular clearance between the shell 24 and reactor 9 embraced by same and reaches the receptacle 23 of the separator 6 where the velocity of the air-/catalyst stream drops sharply, enabling the catalyst 10 to settle back into the casing 1 of the contrivance due to gravity while the air is vented to atmosphere through the receptacle 23 and pipe 30. Hot air is circulated through the contrivance as long as this is required for warming up the catalyst 10 to a temperature at which the process of ethylene oxidation takes place, i.e., to between 280° and 300° C. Upon reaching this temperature, the supply of air is cut off and the pipes 14 are connected to a line feeding an ethylene/air mixture and the pipe 30 is connected to a line for discharging the products of reaction from the reaction contrivance. After that, an ethylene/air mixture heated to 300° C is admitted into the mixing chamber 5. The shell 16 directs this mixture from the receptacle 13 of the mixing chamber 5 to the inlet of the reactor 9 where a suction action is created, thus causing the catalyst 10 to be drawn from the casing 1 into the reactor 9. The catalyst 10 forms a reaction mixture with the ethylene/air mixture. This reaction mixture is of an optimum composition when the catalyst content is between 135 and 160 kg/m³, and this content is obtained by feeding the ethylene/air mixture at a certain permanent rate of flow. When the reaction mixture passes through the reactor 9 from bottom to the top, the velocity of the ethylene/air component is approximately twice that of the catalyst 10 while each catalyst pellet makes headway and rotates about its axis at the same time so that the entire surface of the catalyst is in contact with the ethylene/air mixture and which takes part in the reaction of ethylene oxidation. This adds to the rate of reaction, brings about an almost instantaneous heat transfer between the catalyst and ethylene/air mixture thus eliminating local overheating in the reactor 9. The entire ethylene charge oxidizes into ethylene oxide during the reaction which is accompanied by the liberation of heat in considerable amounts. In order to remove the excessive heat evolved mainly due to the side reactions of combustion of some of the ethylene in the oxygen of air and to maintain the temperature within the limits of from 280° to 300° C, use is made of the cooling coil 11 disposed in the annular space between the reactor 9 and the casing 1. Circulating through the coil 11 is a coolant, for example freon, which is cooled down on leaving the coil 11 and then fed again.

The gaseous products of the reaction of ethylene oxidation leave the reactor 9 mixed with the catalyst through the outlet 25 and enter the shell 24 of the separator 6. Since the diameter of the shell 24 is by far greater of the diameter of the reactor 9 there is a sharp decrease in the velocity of the products of reaction and the catalyst 10 leaving same with the results that the bulk of the catalyst is separated from the gaseous products due to gravity, settling down into the casing 1 through the annular space between the shell 24 and reactor 9 embraced by same. Next, the stream of gaseous products with the remnants of the catalyst 10 enters the receptacle 23 of the separator 6 whose diameter is from 6 to 8 times that of the reactor 9 so that a further decrease in the velocity takes place, thus enabling the rest of the catalyst 10 to drop into the casing 1 by gravity. The products of reaction separated from the catalyst 10 are removed from the reaction contrivance through the pipe 30 in the receptacle 23 of the separator 6 and directly for separation of the final product, i.e., ethylene oxide, from the ethylene which has failed to react in the reactor 9. The unreacted ethylene is returned back into the reaction contrivance for reoxidation. To that end, the pipes 32 disposed in the casing 1 above the bed of the catalyst 10 are opened and the ethylene is fed in which a mixture of hot air into the annular space between the cylinder 2 of the casing 1 and the reactor 9 at 300° C. The ethylene/air mixture rises upwards contorting the catalyst, 10 which is settling down from the separator 6 upon being separated from the gaseous products of reaction. The velocity of the dropping catalyst 10 is twice the velocity of the ethylene/air mixture admitted through the pipes 32 and the contact with the catalyst takes place at a temperature of between 260° and 280° C. Said velocity and temperature have been found to be the optimum one for accomplishing the process of oxidizing the unreacted ethylene over the falling catalyst 10. The gaseous products resulting from said reaction enter the receptacle 23 of the separator 6 and are removed from the reaction contrivance through the pipe 30 for further separation together with the products of reaction which have entered the separator 6 from the reactor 9. The possibility of oxidizing the ethylene which has failed to react in the reactor 9 considerably increases the yield of final product.

The operation of a reaction contrivance with a plurality of reactors 9 does not differ from that of the contrivance featuring just one reactor 9.

What is claimed is:

1. An apparatus for oxidatively reacting hydrocarbons in the presence of a catalyst comprising: a vertical casing; at least one reactor having an inlet for the introduction of reaction materials and an outlet for discharging the reaction products disposed in said casing; an annular space formed between said casing and said reactor for accomodating a bed of catalyst; a mixing chamber mounted at the bottom of said casing communicating with said annular space with said catalyst accomodated therein and the reactor; inlet pipes communicating with said mixing chamber for the introduction of reactants into said mixing chamber; means for directing the reactants and the catalyst from said mixing chamber into said reactor; a separator disposed at the top of said casing communicating both with the reactor outlet and the annular space; an outlet pipe for the discharge of reaction products from said reactor outlet; means for separating the catalyst from the reaction products, with the catalyst returning to said annular space, and the reaction products exiting via the outlet pipe; and a means for circulating a coolant inside said casing; said separator being a receptacle having a diameter by far greater than the diameter of the reactor, said receptacle being fitted with a pipe for charging the casing of the apparatus with the catalyst before starting the process; said means for separating comprising a shell being disposed in the receptacle serving to change the direction of a stream of the products of the reaction leaving the reactor mixed with the catalyst and embracing a portion of the reactor with its outlet so that a clearance is formed between the internal surface of the shell and the reactor which enables the products of the reaction and catalyst to pass; the distance between the outlet from the reactor and the surface of the shell opposite the outlet from the reactor, as well as the inside diameter of the receptacle of the separator, being selected depending on the velocity of the products of reaction and the catalyst leaving the reaction.

2. The reactor as claimed in claim 1 wherein the casing is provided with at least one additional pipe located above the bed of catalyst and serving to recycle reactants separated from the reaction product and for carrying out the reaction of oxidation of said components in the casing space above the pipes over the catalyst leaving the separator.

3. The apparatus as claimed in claim 1, wherein said directing means is a shell having an orifice, said shell being located within said mixing chamber, said reactants and the catalyst being fed into the reactor from the mixing chamber through said orifice by means of forced gas.

4. An apparatus for oxidatively reacting hydrocarbons in the presence of a catalyst comprising: a vertical casing; at least one reactor having an inlet for the introduction of reaction materials and an outlet for discharging the reaction products disposed in said casing; an annular space formed between said casing and said reactor for accommodating a catalyst; a mixing chamber mounted at the bottom of said casing communicating with said annular space with said catalyst accommodated therein and the reactor; inlet pipes communicating with said mixing chamber for the introduction of reactants into said mixing chamber; means for directing the reactants and the catalyst from said mixing chamber into said reactor; a separator disposed at the top of said casing communicating both with the reactor outlet and the annular space; an outlet pipe for the discharge of reaction products from said reactor outlet; means for separating the catalyst from the reactor products, with the catalyst returning to said annular space, and the reaction products exiting via the outlet pipe; a means for circulating a coolant inside said casing; said mixing chamber being a receptacle embracing a portion of the reactor; said means for directing comprising a rigidly secured shell disposed in near proximity to the reactor inlet, said shell being provided with an opening registering with said reactor inlet, said shell narrowing downwardly toward said opening, and the angle formed by said shell and the internal surface of the receptacle, as well as the area of the opening in the shell, being selected in accordance with the capacity of the apparatus and the size of the catalyst pellets; and means for vertical adjustment of the distance between the reactor inlet and the shell of the mixing chamber, said vertical adjustment means comprising brackets at the top portion of the reactor, shoulders secured to the internal surface of the casing for supporting said brackets, and shims interposed between the bearing surfaces of the brackets and the shoulders.

5. The reactor as claimed in claim 4 wherein the lower portion of the casing is provided with a ring linked with the casing so that the reactor may freely enter the ring which serves to align the inlet of the reactor with the opening in the shell of the mixing chamber.

* * * * *